April 1, 1941.     N. M. COUTY     2,236,967
FLEXIBLE CONNECTION FOR TUBING
Filed May 1, 1939
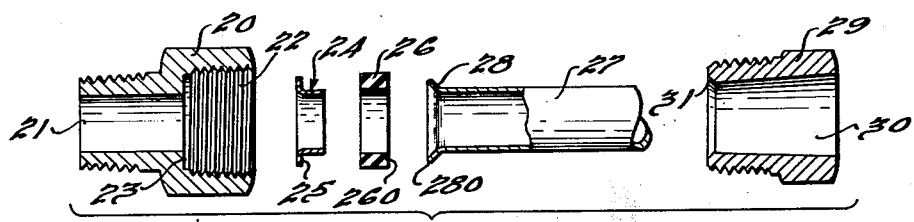
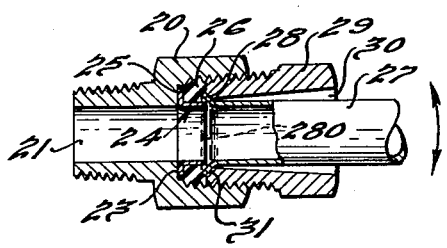 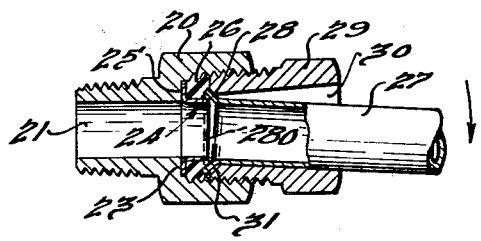
INVENTOR
Norman M. Couty.
BY
ATTORNEY Patented Apr. 1, 1941

2,236,967

UNITED STATES PATENT OFFICE 2,236,967

FLEXIBLE CONNECTION FOR TUBING

Norman M. Couty, Detroit, Mich., assignor to The Flex-O-Tube Company, a corporation of Delaware Application May 1, 1939, Serial No. 271,048

2 Claims. (Cl. 285—90)

This invention relates to flexible connections for tubing and in particular to means for providing non-rigid pressure tight connections between relatively rigid tubing and the like.

In automotive, aircraft, and other types of power plant installations it is necessary to employ tubing and the like for the purpose of conveying fuels, lubricant and coolant from tanks, reservoirs and coolers to the power plant and between the various component elements of the power plant. Severe and continuous vibrational movement generally exists between the various component elements and units of power plants. Flexible tubing or more or less rigid tubing with which non-rigid connections are generally employed are used to connect the various units of the fuel, lubricating and cooling systems of automotive, aircraft and marine power plants and in other instances where vibration is likely to cause structural and hydraulic failures of lines employed to carry fluids. When semi-rigid or rigid tubing is employed, a suitable flexible connection is required to prevent structural and hydraulic failure of the tubing at the connecting means.

The main object of this invention is to provide a highly efficient non-rigid connection for relatively rigid tubing and the like employed to connect together the members of a hydraulic system which will permit without structural or hydraulic failure vibrational motion therebetween.

Another object of the invention is to provide a non-rigid connection between relatively rigid tubing and the like which is extremely simple in construction, which will resist and absorb vibration without structural failure and which affords a permanent and positive fluid-tight seal.

Another object of the invention is to provide a non-rigid connection for relatively rigid tubing and the like which will permit the said tubing to vibrate freely without danger of crystallization and rupture and, at the same time, assure a permanent and positive fluid-tight seal.

Other objects of the invention will become apparent by reference to the following detailed description taken in connection with the accompanying drawing, in which:

Fig. 1 is an exploded sectional view of a flexible connection for tubing embodying the invention.

Fig. 2 is a longitudinal sectional view of the flexible tubing connection disclosed in Fig. 1.

Fig. 3 is a longitudinal sectional view of the flexible tubing connection disclosed in Figs. 1 and 2 showing the tubing in an extreme flexed position.

Referring to the drawing wherein like numerals refer to like and corresponding parts throughout the several views, the various embodiments of the invention are disclosed therein in conjunction with a male externally threaded pipe fitting, however, it is to be understood that the invention may be used with and applied to various other types of pipe fittings and couplings as may be desired or required.

Referring now particularly to the illustrative embodiment of the invention disclosed in the drawing, the externally threaded male pipe fitting 20 is provided with a bore 21 and a threaded counterbore 22 of such relative proportions as to provide an annular seat 23 at the base of the said threaded counterbore 22. A grommet 24 preferably having an internal diameter equal to the diameter of the bore 21 in the pipe fitting 20 and a radially extending flange 25 substantially the same size as the annular seat 23 formed in the said male pipe fitting 20 by the counterbore 22 is placed in the said counterbore 22 with the radially extending flange 25 thereof disposed against the annular seat 23 in the said pipe fitting 20. An annular resilient washer 26 is then placed over the grommet 24.

The relatively rigid tubing 27 which is to be connected to the pipe fitting 20 is provided with a flared end 28, and the annular edge 280 of the said flared end 28 of the tubing 27 is placed against the exposed annular end 260 of the said resilient washer 26. An externally threaded retaining nut 29 having a tapered bore 30 therethrough and a frusto-conical tube flare engaging seat 31 at the threaded end thereof shaped to engage the flared end 28 of the said relatively rigid tubing 27 is telescoped over the said tubing 27 and threaded in the threaded counterbore 22 of the said pipe fitting 20 until the said retaining nut 29 urges the annular edge 280 of the flared end 28 of the tubing 27 into embedded engagement with respect to the said annuler end 260 of the said resilient washer 26, see Fig. 2.

The resilient connection or coupling between the flared tubing 27 and the pipe fitting 20 shown in Figs. 1 and 2 provides a positive fluid-tight seal therebetween and yet permits the tubing 27 and the fitting 20 to vibrate with respect to each other without localized vibrational stress on the tubing 27 at or near the flared end thereof which eliminates any possibility of failure of the said tubing due to crystallization thereof under repeated vibrational movement. The resilient annular washer 26 absorbs the vibrational stresses between the fitting 20 and the tubing 27 when the annular edge 280 of the flared end 28 of the said tubing 27 is tightly compressed in the annular end 260 thereof simultaneously with providing a positive fluid-tight seal between the said fitting 20 and tubing 27.

Fig. 3 shows the flared tubing 27 in an extreme flexed position with respect to the fitting 20 and indicates how the resilient washer 26 gives under vibrational stresses. In no event is there a firm metal to metal gripping between the flared tubing 27 and the fitting 20. The resilient annular washer 26 is completely confined against bulging into the bore 21 of the pipe fitting 20 whereby to positively avoid undesirable restriction of the flow of fluid through the flared tubing 27 and the fitting 20.

Although but one embodiment of the invention has been disclosed and described in detail, it will be understood that various changes including the size, shape, arrangement and detail of the parts thereof may be made without departing from the spirit of the invention, and it is not intended to limit the scope of the invention other than by the terms of the appended claims.

I claim:

1. In a flexible connection for flared end tubing comprising a coupling member having an axial bore and threaded counterbore therethrough forming an annular seat at the base of the said counterbore, a resilient annular washer disposed in the said counterbore, and an externally threaded retaining nut having a bore larger than the said tubing axially therethrough telescoped over the said tubing and threaded in the counterbore of the said coupling member, the said retaining nut having a frusto-conical seat formed at the inner end thereof adapted to engage the flared end of the said tubing and urge the annular edge of the said flared tubing end axially into resilient sealed contact concentrically against the annular face of the said resilient annular washer when said retaining nut is threaded in the counterbore of the said coupling member whereby to hold the said tubing in concentric spaced relationship within said retaining nut and admit of the said tubing flexing with respect to the coupling member under vibrational stresses.

2. A flexible connection for flared end tubing comprising a coupling member having an axial bore and threaded counterbore therethrough forming an annular seat at the base of the said counterbore, a resilient annular washer disposed in the said counterbore, an externally threaded retaining nut having a tapered bore larger at its smallest end than the said tubing axially therethrough telescoped over the said flared tubing and threaded in the counterbore of the said coupling member, the said retaining nut having a frusto-conical seat formed at the inner end thereof adapted to engage the flared end of the said tubing and urge the annular edge of the said flared tubing end axially into resilient sealed contact concentrically against the annular face of the said resilient annular washer when said retaining nut is threaded in the counterbore of the said coupling member whereby to hold the said tubing in concentric spaced relationship within said retaining nut and admit of the said tubing flexing with respect to the coupling member under vibrational stresses, and a grommet disposed internally of said washer to prevent said washer from expanding inwardly into the passage through said fitting.

NORMAN M. COUTY.